US009469242B2

(12) United States Patent
Imaeda et al.

(10) Patent No.: US 9,469,242 B2
(45) Date of Patent: *Oct. 18, 2016

(54) HEADLAMP LIGHT DISTRIBUTION CONTROL DEVICE

(71) Applicant: DENSO CORPORATION, Kariya, Aichi-pref. (JP)

(72) Inventors: Koji Imaeda, Inazawa (JP); Kentarou Shiota, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 61 days.

This patent is subject to a terminal disclaimer.

(21) Appl. No.: 14/512,503

(22) Filed: Oct. 13, 2014

(65) Prior Publication Data

US 2015/0028742 A1 Jan. 29, 2015

Related U.S. Application Data

(63) Continuation-in-part of application No. 13/556,519, filed on Jul. 24, 2012, now Pat. No. 8,884,522.

(30) Foreign Application Priority Data

Jul. 28, 2011 (JP) ................. 2011-165627

(51) Int. Cl.
| | |
|---|---|
| *B60Q 1/14* | (2006.01) |
| *G06K 9/00* | (2006.01) |
| *G06K 9/20* | (2006.01) |
| *G06K 9/46* | (2006.01) |

(52) U.S. Cl.
CPC ......... *B60Q 1/143* (2013.01); *B60Q 2300/056* (2013.01); *B60Q 2300/41* (2013.01);

(Continued)

(58) Field of Classification Search
CPC B60Q 1/085; B60Q 1/143; B60Q 2300/056; B60Q 2300/41–2300/43; B60Q 1/1438; B60Q 1/1446; B60Q 1/0023; B60Q 9/006; B60Q 9/007; B60Q 2300/05; G06K 9/00825
USPC ................................................ 362/465, 460
See application file for complete search history.

(56) References Cited

U.S. PATENT DOCUMENTS 6,481,876 B2 * 11/2002 Hayami ................. B60Q 1/085
362/276
8,552,648 B2 10/2013 Hayakawa
(Continued)

FOREIGN PATENT DOCUMENTS

| JP | 06-267303 | 9/1994 |
| JP | 07-182484 | 7/1995 |

(Continued)

*Primary Examiner* — Jimmy Vu
*Assistant Examiner* — Henry Luong
(74) *Attorney, Agent, or Firm* — Harness, Dickey & Pierce, P.L.C.

(57) ABSTRACT

In a headlamp light distribution control device, a light source configured by a pair of lamps mounted in a forward vehicle is extracted from an image of the forward vehicle if a distance to the forward vehicle is less than a predetermined value, and the number of the extracted light sources is judged. When the number of the extracted light sources is two, an irradiation direction of a headlamp is controlled such that a shielded area is set in an irradiation area to prevent an area including the lamp of the forward vehicle from being irradiated. When the number of the extracted light sources is one, the irradiation direction is controlled such that a shielded area is set in the irradiation area to have a margin in right and left directions larger than the shielded area set when the number of the extracted light sources is two.

19 Claims, 8 Drawing Sheets

(52) U.S. Cl.
CPC ....... *B60Q2300/42* (2013.01); *G06K 9/00798* (2013.01); *G06K 9/00805* (2013.01); *G06K 9/00825* (2013.01); *G06K 9/2018* (2013.01); *G06K 9/4633* (2013.01); *G06K 9/4652* (2013.01)

(56) References Cited

U.S. PATENT DOCUMENTS

| | | |
|---|---|---|
| 2008/0084165 A1 | 4/2008 | Otsuka et al. |
| 2008/0088481 A1 | 4/2008 | Kumon et al. |
| 2008/0130302 A1* | 6/2008 | Watanabe ............ B60Q 1/085 362/466 |
| 2009/0086497 A1 | 4/2009 | Kamioka et al. |

FOREIGN PATENT DOCUMENTS

| | | |
|---|---|---|
| JP | 2008-037240 | 2/2008 |
| JP | 2008-094127 | 4/2008 |
| JP | 2008-094249 | 4/2008 |
| JP | 2008-110723 | 5/2008 |
| JP | 2008-114800 | 5/2008 |

\* cited by examiner

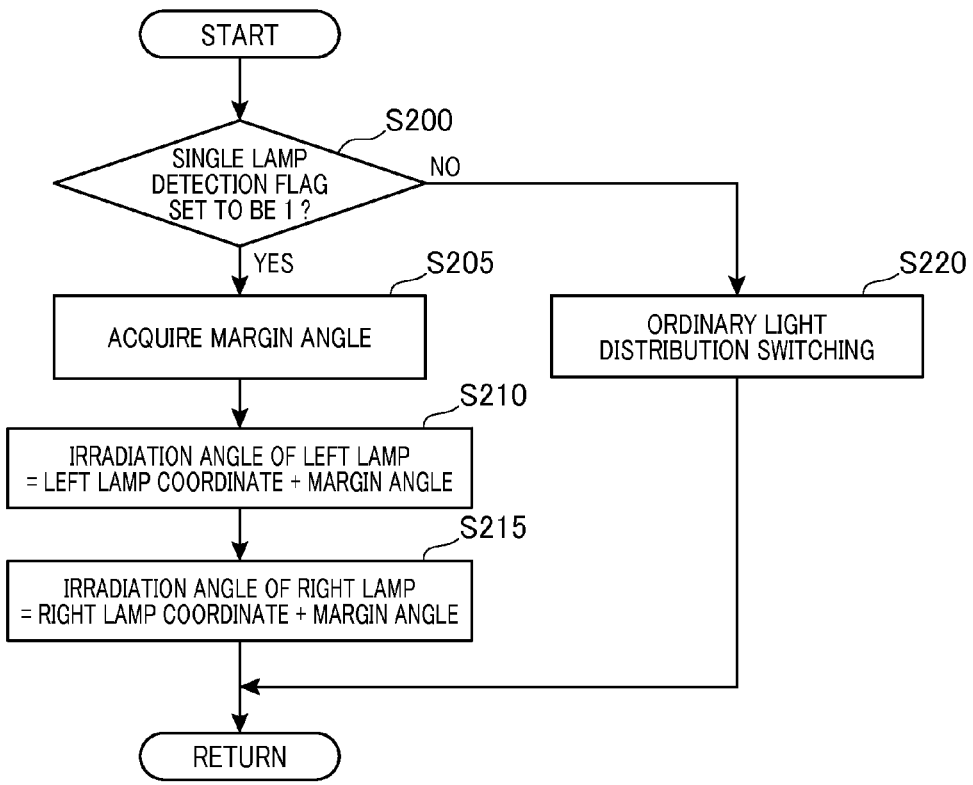

| SENSOR DETECTION STATE | | CORRECTION OF SHIELDED AREA | VARIATION IN DETECTED DISTANCE | SIZE OF SHIELDED AREA |
|---|---|---|---|---|
| MILLIMETER WAVE RADAR | CAMERA | | | |
| ○ | SINGLE/PAIR | ENLARGEMENT AT NEAREST DISTANCE | SMALL | SMALL |
| × | PAIR | ENLARGEMENT AT NEAREST DISTANCE | MEDIUM | MEDIUM |
| × | SINGLE | ENLARGEMENT AT NEAREST DISTANCE | LARGE | LARGE |

HEADLAMP LIGHT DISTRIBUTION CONTROL DEVICE

CROSS-REFERENCE TO RELATED APPLICATION

This application is a continuation-in-part of U.S. patent application Ser. No. 13/556,519, filed Jul. 24, 2012, which is based on and claims the benefit of priority from earlier Japanese Patent Application No. 2011-165627 filed Jul. 28, 2011, the description of which is incorporated herein by reference.

BACKGROUND

1. Technical Field

The present invention relates to a headlamp light distribution control device that performs switching control of an irradiation direction of a vehicular headlamp.

2. Related Art

In the related art, there has been known a device that automatically switches an irradiation direction of a vehicular headlamp (headlight) to be moved up and down based on whether or not a vehicle is present in front of own vehicle. This device detects a lamp such as a tail lamp (tail light) mounted in a forward vehicle from an image of an area in front of own vehicle obtained by a camera. If a lamp is detected, the device judges that the forward vehicle etc. is present, and then switches an irradiation direction of a headlamp of own vehicle (see, e.g., JP-A-2008-037240).

In addition, there has been known a method called "ADB (adaptive driving beam)" that is used for controlling an irradiation direction of a vehicular headlamp so as to be displaced laterally outwardly, if a forward vehicle is present, in order to prevent a driver of the forward vehicle from being dazzled by irradiating the headlamp of own vehicle to the forward vehicle.

In the related art, the lamp of the forward vehicle is detected based on only the image obtained by the camera. In this case, for example, if a distance to the forward vehicle is large, a tail lamp actually composed of a pair of lamps cannot be judged as being two lamps, but may be judged as being one lamp, due to the finite resolution of the camera.

The above judgment that the tail lamp is one lamp may be caused by malfunction of either of two lamps, or by the finite resolution of the camera despite normal lighting of both of the two lamps. This makes it difficult to determine why the pair of lamps mounted in the forward vehicle is judged as being composed of one lamp.

ADB control is performed so as to irradiate the outside of the lamp. Due to this, if one of two lamps is malfunctioning and then cannot be lit, the outside of the other of two lamps which is lit is irradiated. This results in irradiation of a seat position of the driver of the forward vehicle, thereby dazzling the driver of the forward vehicle.

SUMMARY

The present disclosure provides a headlamp light distribution control device which is able to control an irradiation direction of a headlamp so as to prevent a driver of a forward vehicle from being dazzled, even if one of a pair of lamps mounted in the forward vehicle is not lit.

According to a first aspect of the present disclosure, there is provided a headlamp light distribution control device for a vehicle, including an image acquisition unit, an extraction unit, an distance acquisition unit, a judgment unit, and a control unit.

The image acquisition unit acquires an image of a forward area which is an area in front of own vehicle. The extraction unit extracts a forward vehicle from the acquired image of the forward area to produce an image of the extracted forward vehicle. The distance acquisition unit that acquires a distance from own vehicle to the forward vehicle.

The judgment unit extracts a lamp configured by a pair of lamps mounted in the forward vehicle from the image of the extracted forward vehicle to produce an image of the extracted lamp, if the distance acquired by the distance acquisition unit is less than a predetermined value, and judges whether the extracted lamp is in a both lamps lit state or in an single lamp lit state.

Here, a "both lamps lit state" refers to a state where both of a pair of lamps such as headlamps or tail lamps are lit. An "single lamp lit state" refers to a state where only one a pair of lamps is lit due to malfunction thereof etc.

The control unit controls an irradiation direction of a headlamp of the own vehicle such that a first shielded area is set in an irradiation area of the headlamp of the own vehicle so as to prevent an area including the lamp of the forward vehicle from being irradiated, if judged that the extracted lamp of the forward vehicle is in the both lamps lit state, and such that a second shielded area is set in the irradiation area of the headlamp of own vehicle so as to have a margin in right and left directions larger than the first shielded area, if judged that the extracted lamp is in the single lamp lit state.

According to the headlamp light distribution control device, an irradiation direction of a headlamp can be controlled so as to prevent a driver of a forward vehicle from being dazzled, even if one of the pair of lamps mounted in the forward vehicle is not lit. This reason is explained in detail below.

When an image of a forward area of the own vehicle is acquired by the image acquisition unit, a forward vehicle is extracted from the acquired image of the forward area image to produce an image of the extracted forward vehicle and then a lamp mounted in the forward vehicle is extracted from the image of the extracted forward vehicle. This may make it difficult to judge whether the extracted lamp is in the single lamp lit state or the both lamps lit state depending on, e.g., an image acquisition performance of the image acquisition unit such as a resolution, or a method for extracting the forward vehicle, if a distance to the forward vehicle is large.

In contrast, in the headlamp light distribution control device of the present disclosure, the judgment unit performs an extraction of the lamp and a judgment on whether the lamp is in the both lamps lit state or the single lamp lit state, if the distance acquired by the distance acquisition unit is less than the predetermined value.

Therefore, the headlamp light distribution control device can precisely perform an extraction of the lamp and a judgment on whether the lamp is in the single lamp lit state or in the both lamps lit state, by setting the predetermined value based on an image acquisition performance of the image acquisition unit such as a resolution, or a method for extracting the forward vehicle.

As a lamp which is mounted outside a vehicle body and is not blinking during a predetermined period, the forward vehicle frequently uses a lamp composed of a pair of lamps such as a headlamp or a tail lamp mounted in the right and left sides of the vehicle body.

Thus, when a headlamp of own vehicle is lit, if judged that the lamp of the forward vehicle is in the both lamps lit state, a first shielded area is set in an irradiation area of the headlamp of own vehicle so as to prevent an area including the pair of lamps of the forward vehicle from being irradiated. This can prevent a driver of the forward vehicle from being dazzled by the headlamp.

On the other hand, if judged that the lamp is in the single lamp lit state, there is a high possibility that one of the pair of lamps composed of the lamp mounted in the forward vehicle is not lit due to, e.g., malfunction.

In this case, it is difficult to realize which lamp of the lamps on the right and left sides of the forward vehicle has malfunctioned. Due to this, a second shielded area is set to have a right and left margins larger than the first shielded area which is set when the lamp is judged as being in the both lamps lit state.

Then, even if one lamp of two lamps on the right and left sides of the forward vehicle has malfunctioned, the forward vehicle cannot be irradiated. This can also prevent a driver of the forward vehicle from being dazzled by irradiation from the headlamp.

Thus, the headlamp light distribution control device can precisely perform a judgment on whether the lamp is in the single lamp lit state or in the both lamps lit state, and therefore, an irradiation area of the headlamp can be set in an appropriate range.

Here, the "forward vehicle" refers to a vehicle which runs in front of an own vehicle such as a "proceeding vehicle", which runs in the same direction as own vehicle, or an "oncoming vehicle", which runs on the opposite lane.

In the headlamp light distribution control device, the judgment unit may be configured to: calculate a distance between the two lamps of the extracted lamp; judge that the extracted lamp is in the single lamp lit state if the distance is less than a predetermined value; and judge that the extracted lamp is in the both lamps lit state if the distance is equal to or more than the predetermined value.

This can make it possible to precisely judge whether the lamp is in the single lamp lit state or in the both lamps lit state, by using a simple process to judge whether or not a distance between the two lamps of the extracted lamp is less than a predetermined value.

On the other hand, if the extracted lamp is in the single lamp lit state, the second shielded area is set in the irradiation area of the headlamp so as to have a margin in right and left directions larger than the first shielded area. In this case, if the second shielded area is always set to have a margin with a constant width and angle, the margin may be too large when the forward vehicle is far away from the own vehicle. That is, the second shielded area may be too large.

Thus, in the headlamp light distribution control device, the control unit may be configured to change the margin in right and left directions to be larger, as the distance acquired by the distance acquisition unit is smaller.

In this way, the margin in right and left of the shielded area is changed to be larger, as the distance from own vehicle to the forward vehicle is smaller. In other words, the margin in right and left directions is changed to be smaller as the distance from the own vehicle to the forward vehicle is larger. Thus, the margin can be prevented from being too large, even if the forward vehicle is far away from the own vehicle.

In one exemplary embodiment, there is provided a headlamp light distribution control device for a vehicle. The headlamp light distribution control device includes an image acquisition unit, an extraction unit, a distance acquisition unit, and a judgment unit. The image acquisition unit is configured to acquire an image of a forward area which is ahead of an own vehicle. The extraction unit is configured to extract a forward vehicle from the image of the forward area acquired by the image acquisition unit. The distance acquisition unit is configured to acquire a distance between the own vehicle and the forward vehicle. The judgment unit is configured to extract a light source (lamp) configured by a pair of lamps mounted in the forward vehicle from the image of the forward vehicle extracted by the extraction unit if the distance from the own vehicle to the forward vehicle acquired by the distance acquisition unit is less than a predetermined value, and judge the number of the extracted lamps. The control unit is configured to set, when the judgment unit judges that the number of the extracted light sources is two, a shielded area in an irradiation area of a headlamp of the own vehicle so as to prevent an area including the lamp of the forward vehicle from being irradiated, and set, when the judgment unit judges that the number of the extracted light source is one, a shielded area in the irradiation area of the headlamp of own vehicle so as to have a margin in right and left directions larger than the shielded area set when the number of the extracted light source is two.

In one exemplary embodiment, there is provided a headlamp light distribution control device for a vehicle. The headlamp light distribution control device includes an image acquisition unit, an extraction unit, and a control unit. The image acquisition unit is configured to acquire an image of a forward area which is ahead of an own vehicle. The extraction unit is configured to extract a forward vehicle from the image of the forward area acquired by the image acquisition unit. The control unit is configured to set, when the number of light sources in the image of the extract forward vehicle is two, a shielded area in an irradiation area of a headlamp of the own vehicle so as to prevent an area including the lamp of the forward vehicle from being irradiated, and set, when the number of light sources in the image of the extract forward vehicle is one, a shielded area in the irradiation area of the headlamp of own vehicle so as to have a margin in right and left directions larger than the shielded area set when the number of the extracted light sources is two.

The headlamp light distribution control device according to claim 2, further comprising:

In this case, the headlamp light distribution control device may further include a distance acquisition unit and a judgment unit. The distance acquisition unit is configured to acquire a distance between the own vehicle and the forward vehicle. The judgment unit is configured to extract a light source (lamp) configured by a pair of lamps mounted in the forward vehicle from the image of the forward vehicle extracted by the extraction unit if the distance from the own vehicle to the forward vehicle acquired by the distance acquisition unit is less than a predetermined value, and judge the number of the extracted light sources.

In the exemplary embodiments, the distance acquisition unit may acquire distance information indicating a distance between the own vehicle and the forward vehicle from at least one of a radar, a stereo camera, and a monocular camera. Based on a variation in the distance indicated by the acquired distance information, the control unit may set the shielded area to be larger as the variation in the distance becomes larger.

In this case, the control unit may set the shielded area so as to satisfy a relationship expressed by A>B>C where A is a size of the shielded area that is set when the distance information is acquired by the radar or the stereo camera, B is a size of the shielded area that is set when the distance information is not acquired by the radar or the stereo camera and when the number of lamps of the forward vehicle is two, and C is a size of the shielded area that is set when the distance information is not acquired by the radar or the stereo camera and when the number of lamps of the forward vehicle is one.

In the exemplary embodiments, the headlamp light distribution control device may further include a stereo camera capable of acquiring a distance between the forward vehicle and the own vehicle. The headlamp light distribution control device may further include a radar capable of detecting at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, and an external environment of the own vehicle.

In one exemplary embodiment, there is provided a camera device, coupled to a headlamp system for a vehicle. The headlamp system includes a headlamp irradiating light in front of an own vehicle and a changing unit for changing an irradiation area of the headlamp. The camera device includes: a control unit configured to control the changing unit, an image acquisition unit configured to acquire an image of a forward area which is ahead of the own vehicle; and an extraction unit configured to: extract a forward vehicle from the image of the forward area acquired by the image acquisition unit; and extract a light source (lamp) configured by a pair of lamps mounted in the forward vehicle from the image of the extracted forward vehicle. The control unit is configured to: i) set, when the number of light sources in the image of the extract forward vehicle is two, a shielded area in an irradiation area of the headlamp of the own vehicle so as to prevent an area including the lamp of the forward vehicle from being irradiated; ii) set, when the number of the extracted light sources is one, a shielded area in the irradiation area of the headlamp of own vehicle so as to have a margin in right and left directions larger than the shielded area set when the number of the extracted light sources is two; and iii) output information of the set shielded area to the changing unit.

In this case, the camera device may include a stereo camera capable of acquiring a distance between the forward vehicle and the own vehicle. The camera device may include a radar capable of detecting at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, and an external environment of the own vehicle.

In one exemplary embodiment, there is provided a camera device, coupled to a headlamp system for a vehicle. The headlamp system includes a headlamp irradiating light in front of an own vehicle and a changing unit for changing an irradiation area of the headlamp. The camera device includes: a control unit configured to control the changing unit, an image acquisition unit configured to acquire an image of a forward area which is ahead of the own vehicle; and an extraction unit configured to: extract a forward vehicle from the image of the forward area acquired by the image acquisition unit; and extract a light source (lamp) configured by a pair of lamps mounted in the forward vehicle from the image of the extracted forward vehicle.

The control unit is configured to:

i) detect, based on the image of the forward area, at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, and an external environment of the own vehicle;

ii) control the changing unit to change, when the at least one of target objects is detected, the irradiation area of the headlamp so as to reduce a glare of the headlamp given to the detected at least one of target objects;

iii) perform a vehicle control for the own vehicle regarding at least one of a forward collision avoidance, an intersection collision avoidance, a crossing collision avoidance, a speed alert, a lane deviation prevention, a collision alert, an inter-vehicle distance alert, a lane deviation alert, an automatic high beam, a traffic sign display, a full speed range adaptive cruise control, a lane keeping, a lane changing accident prevention, a blind spot alert, a blind spot monitor, an automatic lane changing, a front cross traffic alert, a rear cross traffic alert, a stepping error prevention (preventing pedal application errors of a brake pedal and an accelerator pedal), an automatic parking;

iv) set, when the number of the extracted light sources is two, a shielded area in an irradiation area of the headlamp of the own vehicle so as to prevent an area including the lamp of the forward vehicle from being irradiated;

v) set, when the number of the extracted light sources is one, a shielded area in the irradiation area of the headlamp of own vehicle so as to have a margin in right and left directions larger than the shielded area set when the number of the extracted light sources is two; and vi) output information of the set shielded area to the changing unit.

In this case, the camera device may include a stereo camera capable of acquiring a distance between the forward vehicle and the own vehicle. The camera device may include a radar capable of detecting the at least one of target objects.

BRIEF DESCRIPTION OF THE DRAWINGS

In the accompanying drawings:

FIG. 4 is a flowchart for showing a subroutine for variable light distribution process called from the main routine of the light distribution process of FIG. 3;

FIG. 5 is a diagram for explaining a margin angle with respect to a distance to the forward vehicle and a lamp width which is a distance between a pair of lamps configuring a lamp mounted on the forward vehicle;

DESCRIPTION OF THE EMBODIMENTS

First Embodiment

A first embodiment will hereinafter be described with reference to the drawings.

Figure 1:
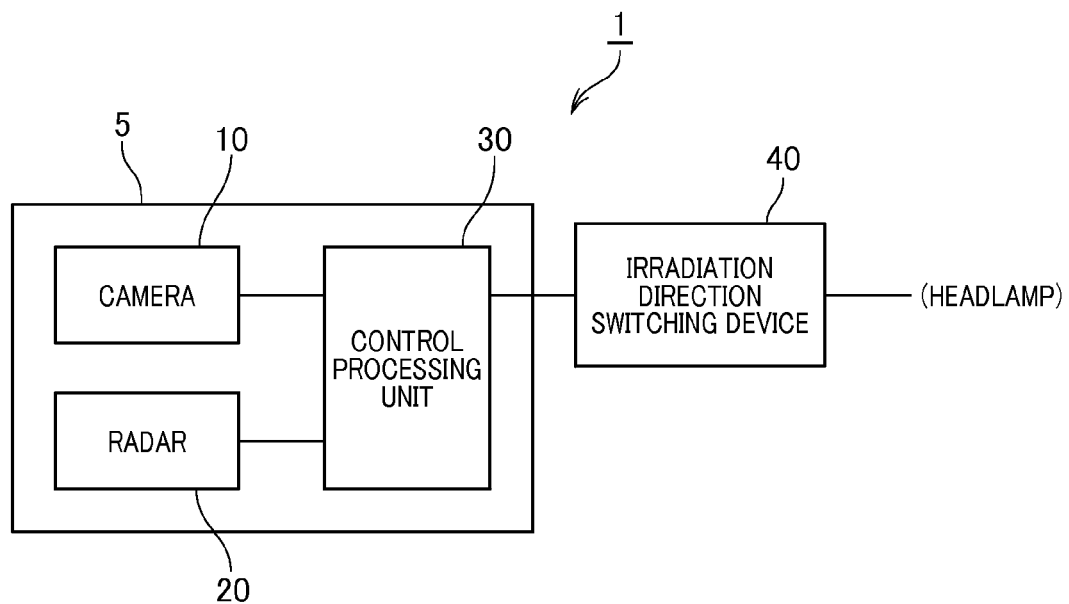
FIG. 1 is a block diagram for showing a configuration of a headlamp light distribution apparatus including a headlamp light distribution control device according to a first embodiment.

FIG. 1 is a block diagram for showing an outline of a configuration of a headlamp light distribution apparatus 1 to which a headlamp light distribution control device according to the present embodiment is applied. The headlamp light distribution apparatus 1 includes a headlamp light distribution control device 5 and an irradiation direction switching device (corresponding to a changing unit) 40 which is connected to headlamps (headlights) mounted in own vehicle.

The headlamp light distribution control device 5 includes a camera 10, a radar 20, and a control processing unit 30.

The camera 10 is configured by, e.g., a CCD (charge coupled device) camera or an infrared camera, and is mounted on the front side of a vehicle body or in a vehicle compartment of the own vehicle, such that an image of a forward vehicle in front of own vehicle 50 is acquired. In the present embodiment, the camera 10 corresponds to an image acquisition unit.

The radar 20 is configured by, e.g., a pulse radar or FMCW (frequency modulated continuous wave) radar, and acquires a distance from the own vehicle to the forward vehicle. In the present embodiment, the radar 20 corresponds to a distance acquisition unit.

The control processing unit 30 includes a CPU (central processing unit), a ROM (read only memory), a RAM (random access memory), and an I/O (input/output). In addition, a PGA (programmable gate array) for image processing, etc., is mounted in the control processing unit 30. In the present embodiment, the control processing unit 30 corresponds to an extraction unit, a judgment unit and a control unit.

Figure 6:
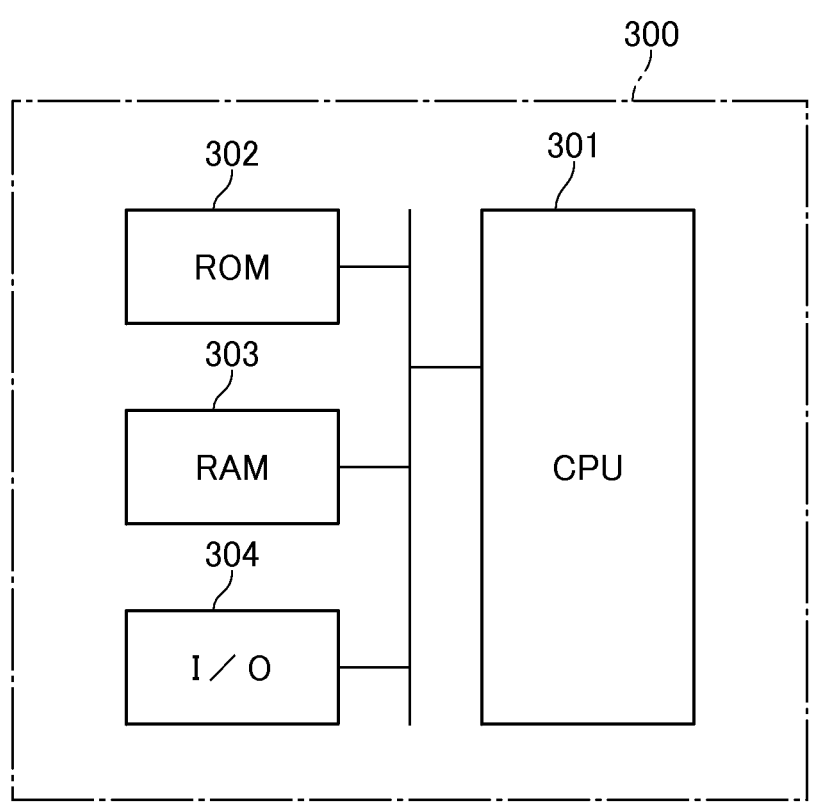
FIG. 6 is a block diagram showing a configuration of a microcomputer configuring a control processing unit of FIG. 1.

FIG. 6 shows an example of the control processing unit 30 which is configured by a microcomputer 300 that is able to be incorporated in an electronic control unit (ECU) mounted in the vehicle. The microcomputer 300 includes a CPU 301, a ROM 302, a RAM 303, and an I/O 304. In the ROM 302, a program for enabling the control processing unit 30 (i.e., the microcomputer 300) to execute at least light a distribution process as described below is stored in advance.

By using the program stored in the ROM 302, the control processing unit 30 (CPU 301) performs a light distribution process, which includes the following steps of:

(i) extracting an image of the forward vehicle in front of the own vehicle from an image of a forward area of the own vehicle acquired by the camera 10;

(ii) extracting tail lamps (tail lights) of the forward vehicle from the image of the forward vehicle extracted in step (i), if a distance from the own vehicle to the forward vehicle acquired by the radar 20 is less than a predetermined value, and judging whether the extracted lamp is in a both lamps lit state or in a single lamp lit state;

(iii) setting a shielded area (hereinafter referred to as the "first shielded area") in an irradiation area of headlamps of own vehicle so as to prevent an area including tail lamps of the lamp of the forward vehicle from being irradiated if judged that the extracted lamp of the forward vehicle is in the both lamps lit state, and setting another shielded area (hereinafter referred to as the "second shielded area") in the irradiation area so as to have a margin in right and left directions thereby making the second shielded area larger than the first shielded area if judged that the extracted lamp is in the single lamp lit state;

(iv) calculating a distance between the tail lamps of the forward vehicle extracted in step (ii), judging that the extracted lamp of the forward vehicle is in the single lamp lit state if the distance is less than a predetermined value, and judging that the extracted lamp is in the both lamps lit state if the distance is equal to or more than the predetermined value; and (v) changing the margin to be larger, as the distance from own vehicle to the forward vehicle acquired by the radar 20 is smaller.

The irradiation direction switching device 40 is a device which receives a command signal from the control processing unit 30 and, based on the received command signal, switches an irradiation direction of headlamps such that a low beam, an intermediate high beam, or a high beam for irradiation is formed.

Figure 2:
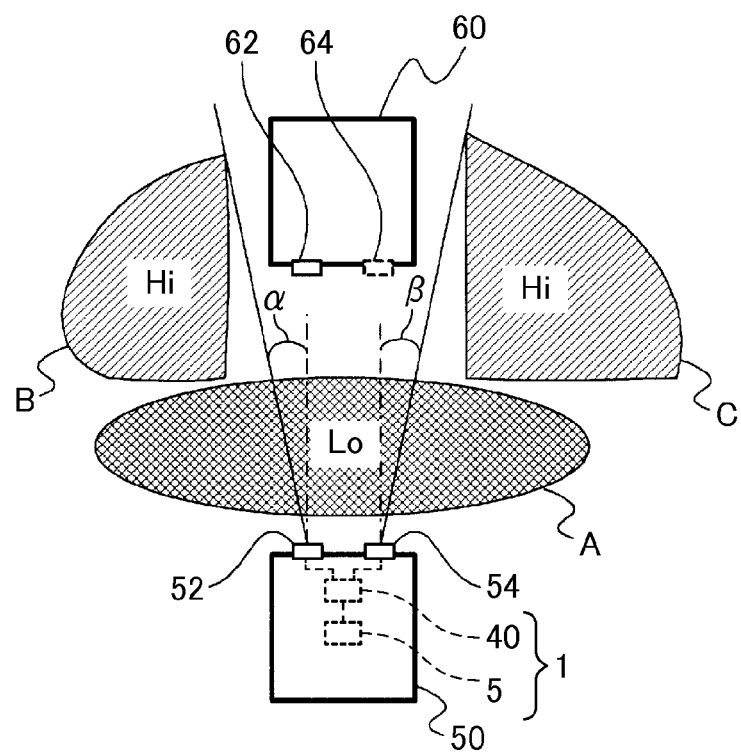
FIG. 2 is a top view of a road surface where the own vehicle and a forward vehicle are present, which aims at explaining a relationship between an irradiation area and the forward vehicle when an irradiation direction of a headlamp is changed.

Next, the irradiation direction of headlamps is described with reference to FIG. 2. FIG. 2 shows a top view of a road surface where the own vehicle 50 and a forward vehicle 60 are present, which aims at explaining a relationship between an irradiation area and the forward vehicle 60 when the irradiation direction of headlamps 52, 54 of the own vehicle 50 is changed.

As shown in FIG. 2, in the low beam, the irradiation direction is set to be downward, i.e., an irradiation angle with respect to the road surface is lower than that of the high beam and the intermediate high beam, so as to irradiate an area of a road surface located closer to the own vehicle 50 (see area A shown in FIG. 2).

In the intermediate high beam, the irradiation direction is set to be upward, i.e., an irradiation angle of the headlamps 52, 54 with respect to the road surface is higher than that of the low beam, so as to irradiate an area further away than the area irradiated by the low beam. Further, in this state, a shielded area capable of shielding an area of the forward vehicle 60 is provided in the irradiated area, and then, areas of only both right and left sides of own vehicle 50 (see areas B and C shown in FIG. 2) are irradiated (i.e., the shielded area is not irradiated) so as to prevent the forward vehicle 60 from being irradiated.

In the high beam, the irradiation direction is set to be upward, i.e., an irradiation angle of the headlamps 52, 54 with respect to the road surface is higher than that of the low beam, and to be forward in front of own vehicle 50, so as to irradiate an area away from the area irradiated by the low beam. Thus, the forward area in front of own vehicle 50 is irradiated, without providing the shielded area as described above.

(Flow of the Light Distribution Process)

Figure 3:
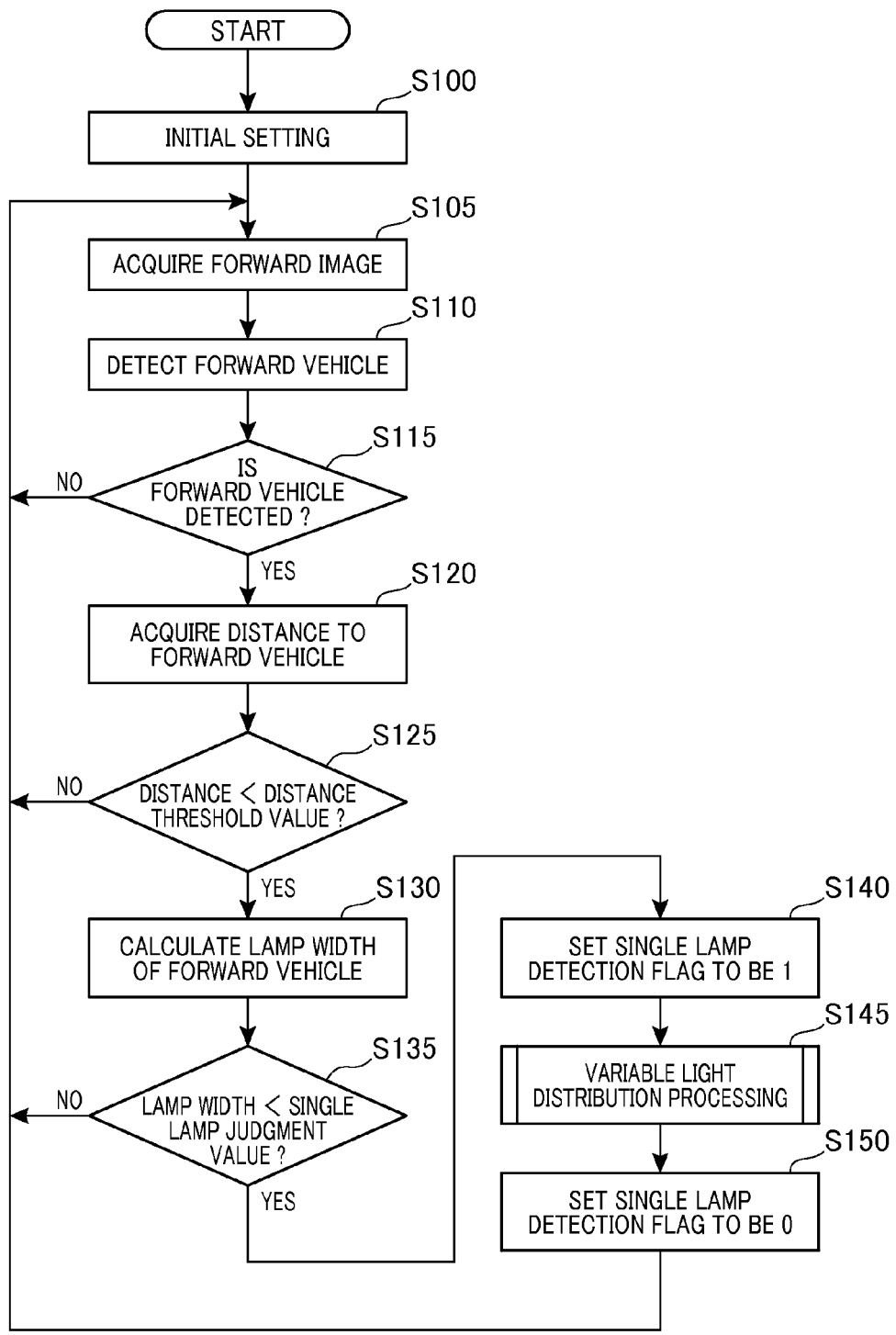
FIG. 3 is a flowchart for showing a main routine of a light distribution process.

Next, a flow of a light distribution process performed by the headlamp light distribution control device 5 is described, with reference to FIGS. 3 and 4. FIG. 3 shows a flowchart of a main routine of the light distribution process performed by the CPU 301 of the microcomputer 300 configuring the control processing unit 30, and FIG. 4 shows a flowchart of a subroutine (variable light distribution process) called from the main routine of FIG. 3.

In the light distribution process, as shown in FIG. 3, first, at step S100, the CPU 301 performs an initial setting (hereinafter, the following processing steps are performed by the CPU 301). In the initial setting, the CPU 301 obtains a distance threshold value and a single lamp judgment value stored in the ROM 302, and sets a single lamp detection flag to be 0. In the present embodiment, the distance threshold value is set to be 500 [m], and the single lamp judgment value is set to be 0.5 [m].

Then, at step S105, the CPU 301 acquires an image of a forward area of own vehicle from the camera 10, and subsequently, at step S110, performs image processing to extract an image of a part of a forward vehicle 60 from the image of the forward area acquired in step S105. Here, since a well-known method such as an image binarization (image thresholding), Hough transform or color identification can be used as the image processing, a detailed description thereof is omitted.

Then, at step S115, the CPU 301 judges whether or not the forward vehicle 60 is detected in step S110, i.e., whether or not a forward vehicle 60 is extracted by the above image processing. As a result, if the forward vehicle 60 is detected (Yes in step S115), the CPU 301 proceeds to step S120 to perform the following process. If the forward vehicle 60 is not detected (No in step S115), the CPU 301 returns to step S105 to repeat the above light distribution process.

Then, at step S120, the CPU 301 acquires a distance to the forward vehicle 60 from the radar 20, and subsequently, at step S125, judges whether or not the distance to the forward vehicle 60 acquired in step S120 is less than the distance threshold value, i.e., 500 [m].

As a result, if the distance acquired in step S120 is less than the distance threshold value (Yes in step S125), the CPU 301 proceeds to step S130 to perform the following process. If the distance acquired in step S120 is equal to or more than the distance threshold value, the CPU 301 returns to step S105 to repeat the above light distribution process.

Then, at step S130, the CPU 301 calculates a distance between a pair of lamps 62, 64 such as tail lamps mounted in a vehicle body of the forward vehicle 60 based on the part of the forward vehicle 60 extracted in step S110, by using the following image processing.

In the above calculation, the CPU 301 extracts the lamps 62, 64 mounted in the forward vehicle 60 from their brightness characteristic obtained by a well-known image processing method, judges whether or not the lamps 62, 64 is a pair of lamps such as tail lamps, and then, if judged that the lamps 62, 64 is a pair of lamps, recognizes the lamps 62, 64 as the pair of lamps.

Then, the CPU 301 calculates an actual distance between the pair of lamps 62, 64 based on: (a) a distance between the pair of the lamps 62, 64 calculated by using the image; and (b) the distance to the forward vehicle 60 acquired in step S120. The above distance (a) is called a "lamp width" below.

If judged that the lamps 62, 64 is not a pair of lamps by the image processing method, the lamp width is set to be 0 [m].

Then, at step S135, the CPU 301 judges whether or not the lamp width calculated in step S130 is less than the single lamp judgment value. As a result, if judged that the lamp width is less than the single lamp judgment value (Yes in step S135), the CPU 301 proceeds to step S140 to perform the following process. If judged that the lamp width is equal to or more than the single lamp judgment value (No in step S135), the CPU 301 returns to step S105 to repeat the above light distribution process.

Then, at step S140, the CPU 301 sets the single lamp detection flag to be 1, which is associated with an "single lamp lit state", because the lamp width is shorter.

Then, at step S145, the CPU 301 performs a variable light distribution process which is described in detail below.

Then, at step S150, the CPU 301 sets the either lamp detection flag to be 0, and returns to step S105 to repeat the above light distribution process.

Here, an "both lamps lit state" refers to a state where both of a pair of lamps 62, 64 such as headlamps or tail lamps mounted in the forward vehicle 60 are lit. An "single lamp lit state" refers to a state where only one of a pair of lamps 62, 64 is lit due to malfunction thereof etc.

(Flow of the Variable Light Distribution Process)

Next, the variable light distribution process which is a subroutine called from the above main routine (step S145) of the light distribution process, with reference to FIG. 4.

In the variable light distribution process, as shown in FIG. 4, at step S200, the CPU 301 judges whether or not the single lamp detection flag is 1, i.e., whether or not the lamps 62, 64 of the forward vehicle 60 is in the "single lamp lit state". As a result, if judged that the single lamp detection flag is 1 (Yes in step S200), the CPU 301 proceeds to step S205. If judged that the single lamp detection flag is not 1 (No in step S200), the CPU 301 proceeds to step S220.

Then, at step S205, the CPU 301 acquires, from the ROM, a margin angle (described below) associated with: (a) the distance to the forward vehicle 60 acquired in step S120; and (b) the lamp width calculated in step S130.

As shown in FIG. 5, the margin angle is determined in association with the distance to the forward vehicle 60 and the lamp width. Here, for example, (a) when the distance to the forward vehicle 60 is 0 to 10 [m] and the lamp width is 2 [m], the margin angle is set to be 15 [deg], (b) when the distance to the forward vehicle 60 is 10 to 100 [m] and the lamp width is 1 [m], the margin angle is set to be 8 [deg], and (c) when the distance to the forward vehicle 60 is 100 to 500 [m] and the lamp width is 0.5 [m], the margin angle is set to be 5 [deg]. That is, as the distance to the forward vehicle 60 is larger, the lamp width is smaller, and therefore, the margin angle is set to be smaller. In other words, as the distance to the forward vehicle 60 is smaller, the lamp width is larger, and then, the margin angle is set to be larger.

As shown in FIG. 2, when an irradiation direction of the left and right headlamps 52, 54 of the own vehicle 50 is set to be the intermediate high beam as described above, the forward vehicle 60 is required to be covered by the shielded area. That is, the shield area is needed to have a margin with respect to a position of the respective left and right lamps 62, 64 of the forward vehicle 60 (hereinafter, referred to as a "left lamp coordinate (left light source coordinate)" and a "right lamp coordinate (right light source coordinate)", respectively). This margin of the shielded area is determined by the above "margin angle", which refers to an angle of an irradiation direction of the respective left and right headlamps 52, 54 with respect to a front direction of own vehicle 50 in left and right directions (direction parallel to the road surface). In FIG. 2, the "margin angle" of the respective left and right headlamps 52, 54 is expressed by "α" and "β", respectively (hereinafter, referred to as a "left margin angle α" and "right margin angle β"). The margin angles acquired in step S205 include the left margin angle α and the right margin angle β.

Then, at step S210, the CPU 301 produces an irradiation angle of the left headlamp 52 (left control angle) by adding the left lamp coordinate (left light source coordinate) of the forward vehicle 60 to the left margin angle α acquired in step S205, and produces an irradiation angle of the right headlamp 54 (right control angle) by adding the right lamp coordinate (right light source coordinate) of the forward vehicle 60 to the right margin angle β acquired in step S205. After that, the CPU 301 returns to the main routine of FIG. 3.

The produced irradiation angle of the left and right headlamps 52, 54 is outputted from the control processing unit 30 to the irradiation direction switching device 40, as a command signal including the left and right control angles. Then, according to the command signal, the irradiation direction of the headlamps 52, 54 is controlled through the irradiation direction switching device 40.

At step S220, the CPU 301 performs a process of an ordinary light distribution switching. Here, the "ordinary light distribution switching" refers to a light distribution switching performed without having the margin, which is set as the right and left margin angles α, β, for the shielded area in the irradiation area.

(Feature of the Headlamp Light Distribution Apparatus)

In the headlamp light distribution apparatus 1 as described above, the control processing unit 30 of the headlamp light distribution control device 5 performs an extraction of the lamps 62, 64 of the forward vehicle 60 and a judgment on whether or not the lamps 62, 64 are in the single lamp lit state or in the both lamps lit state, if the distance from own vehicle 50 to the forward vehicle 60 is less than the predetermined value (distance threshold value).

Therefore, the headlamp light distribution apparatus 1 can precisely perform the extraction of the lamps 62, 64 of the forward vehicle 60 and the judgment on whether the lamps 62, 64 is in the single lamp lit state or in the both lamps lit state, by setting the predetermined value based on an image acquisition performance (e.g., resolution) of the camera 10, or a method (image processing method) for extracting the forward vehicle 60.

When the headlamps 52, 54 of the own vehicle 50 are lit, if judged that the lamps 62, 64 of the forward vehicle 60 are in the both lamps lit state, the shielded area (first shielded area) is set in the irradiation area of the headlamps 52, 54 of own vehicle 50 so as to prevent an area including the lamps 62, 64 of the forward vehicle 60 from being irradiated. This can prevent a driver of the forward vehicle 60 from being dazzled by the headlamps 52, 54.

On the other hand, if judged that the lamps 62, 64 of the forward vehicle 60 is in the single lamp lit state, there is a high probability that only one the lamps 62, 64 of the forward vehicle 60 is not lit due to, e.g., malfunction. In this case, it is difficult to realize which lamp of the lamps 62, 64 on the right and left sides of the forward vehicle 60 has malfunctioned. Due to this, the shielded area (second shielded area) is set to have a right and left margins larger than the shielded area (first shielded area) set when the lamps 62, 64 is judged as being in the both lamps lit state.

Then, even if it is known which lamp of the lamps 62, 64 on the right and left sides of the forward vehicle 60 has malfunctioned, the forward vehicle 60 cannot be irradiated. This can also prevent a driver of the forward vehicle 60 from being dazzled by irradiation of the headlamps 52, 54.

Thus, the headlamp light distribution apparatus 1 can precisely perform the judgment on whether the lamps 62, 64 of the forward vehicle 60 is in the single lamp lit state or in the both lamps lit state, and therefore, the irradiation area of the headlamps 52, 54 can be set in an appropriate range.

In addition, the control processing unit 30 calculates the distance between the lamps 62, 64 of the forward vehicle 60, judges that the lamps 62, 64 are in the single lamp lit state if the distance is less than the predetermined value, and judges that the lamps 62, 64 are in the both lamps lit state if the distance is equal to or more than the predetermined value. A use of this simple process can make it possible to precisely judge whether the lamps 62, 64 of the forward vehicle 60 are in the single lamp lit state or in the both lamps lit state.

Further, the control processing unit 30 changes the right and left margin angles for the shielded area to be larger, as the distance from own vehicle 50 to the forward vehicle 60 acquired by the radar 20 is smaller. Thus, the right and left margins of the shielded area are smaller, as the distance is larger. This can make it possible to prevent the right and left margins of the shielded area from being too large, even if the forward vehicle 60 is far away from own vehicle 50.

Here, the forward vehicle 60 refers to a vehicle which runs in front of own vehicle 50 such as a preceding vehicle running in the same direction as own vehicle 50 or an oncoming vehicle running on the opposite lane.

The embodiment of the present invention is not limited in any way to the above-described embodiment. Various embodiments are possible as long as the embodiment belongs to the technical scope of the present disclosure.

For example, in the above-described embodiment, the radar 20 is used for acquiring a distance from own vehicle 50 to the forward vehicle 60. Instead, vehicle-to-vehicle communication between own vehicle 50 and the forward vehicle 60 may be used for acquiring a distance from own vehicle 50 to the forward vehicle 60.

In the headlamp light distribution control device 5, the camera 10 corresponds to an image acquisition unit, the radar 20 corresponds to an distance acquisition unit, the control processing unit 30 corresponds to an extraction unit (step S105, S110), a judgment unit (steps S115-S140), and a control unit (steps S145, S150, S200-S215). This configuration is not limited to a specific one. However, as long as the above-described function of each unit can be realized, any kind of configuration can be applied.

Second Embodiment

Figure 7:
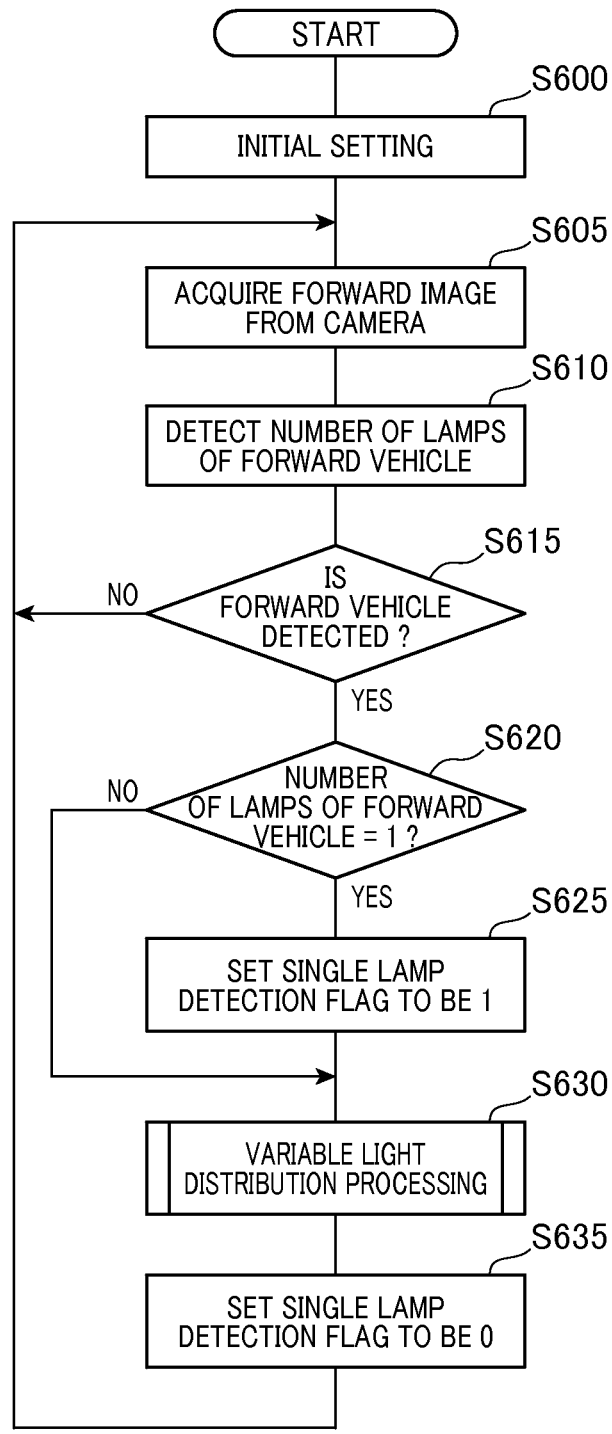
FIG. 7 is a flowchart for showing a main routine of a light distribution process according to a second embodiment.

Next, a second embodiment will be described with reference to FIG. 7. In the present embodiment, a main routine of FIG. 7 is used as a substitute for that of FIG. 3. In the second and the subsequent embodiments and modifications, the components identical with or similar to those in the first embodiment are given the same reference numerals for the sake of omitting unnecessary explanation.

FIG. 7 shows a flowchart for a light distribution control process performed by the control processing unit 30 according to the present embodiment.

In the light distribution process, as shown in FIG. 7, first, at step S600, the control processing unit 30 (e.g., CPU 301 in FIG. 6) performs an initial setting. At step S605, the control processing unit 30 acquires an image of a forward area, which is ahead of an own vehicle, from the camera 10.

At step S610, the control processing unit 30 detects the number of lamps (light sources) of the forward vehicle from the acquired image of the forward area. In the embodiment, the control processing unit 30 detects, among light sources in the acquired image of the forward area, at least one light source that satisfies a predetermined condition such as a color condition, as the lamps of the forward vehicle.

If the at least one light source that satisfies the predetermined condition is not present, the control processing unit 30 detects that the forward vehicle is not present (No in step S615). In this case, the number of lamps of the forward vehicle is 0 (zero).

If the at least one light source that satisfies the predetermined condition is present, the control processing unit 30 detects whether the number of lamps is 1 or 2, based on whether the at least one light source that satisfies a predetermined pair condition is present. The predetermined pair condition is, for example, a condition that a plurality of light sources detected as the lamps have the same height and are adjacent to each other.

If the at least one light source that satisfies the predetermined pair condition is present, the control processing unit 30 detects the at least one light source as a pair of lamps. In this case, the number of lamps is 2. If the at least one light source satisfies the predetermined pair condition is not present, the control processing unit 30 detects the at least one light source as a single lamp. In this case, the number of lamps is 1.

At step S620, the control processing unit 30 determines whether or not the number of lamps of the forward vehicle is 1. If the number of lamps of the forward vehicle is 1 (Yes in step S620), the control processing unit 30 sets the single lamp detection flag to be 1 at step S625. If the number of lamps of the forward vehicle is 1, there is a probability that the forward vehicle is a motorcycle or a single lamp vehicle in which either of right and left lamps is malfunctioning and then cannot be lit.

The judgment process in step S20 may be performed only when the inter-vehicle distance between the forward vehicle and the one vehicle is equal to or less than a predetermined threshold distance.

When the forward vehicle is far away from the own vehicle and then the inter-vehicle distance is large, it is difficult to distinguish the right and left lamps of the forward vehicle from each other due to image resolution of the camera. As a result, the forward vehicle which should be detected as a pair of lamps may be erroneously detected as a single lamp.

Thus, the judgment process in step S20 is performed only when the inter-vehicle distance is equal to or less than the predetermined threshold distance, and then, the number of lamps can be accurately detected. Thus, the light distribution based on the erroneous detection can be prevented.

Based on the number of lamps, the control processing unit 30 sets the single lamp detection flag. If the number of lamps of the forward vehicle is 1 (Yes in step S620), the control processing unit 30 proceeds to step S625 and then sets the single lamp detection flag to 1. If the number of lamps of the forward vehicle is 2 (No in step S620), the control processing unit 30 skips step S630 (i.e., the single lamp detection flag is not set to 1).

At step S630, the control processing unit 30 performs the subroutine of steps S200 to S220 shown in FIG. 4. As described above, in steps S200 to S220 of FIG. 4, the control processing unit 30 sets a shielded area in an irradiation area of the headlamps of the own vehicle when the number of lamps is 1 (Yes in step S200 and steps S205 to S215) so as to have a margin in right and left directions larger than a shielded area set when the number of lamps is 2 (No in step S200 and S220).

At step S635, the control processing unit 30 sets the single lamp detection flag to be 0 and then returns to the process in step S605.

Based on the shielded area as set above, the control processing unit 30 transmits a command signal to the irradiation direction switching device 40 shown in FIG. 1. Thus, based on the received command signal, the irradiation direction switching device 40 switches an irradiation direction of the headlamps to an intermediate high beam in which a predetermined shielded area is provided in the irradiated area of the headlamps as described in the first embodiment.

Third Embodiment

Next, a third embodiment will be described with reference to FIGS. 8 and 9.

Figures 8, 9:
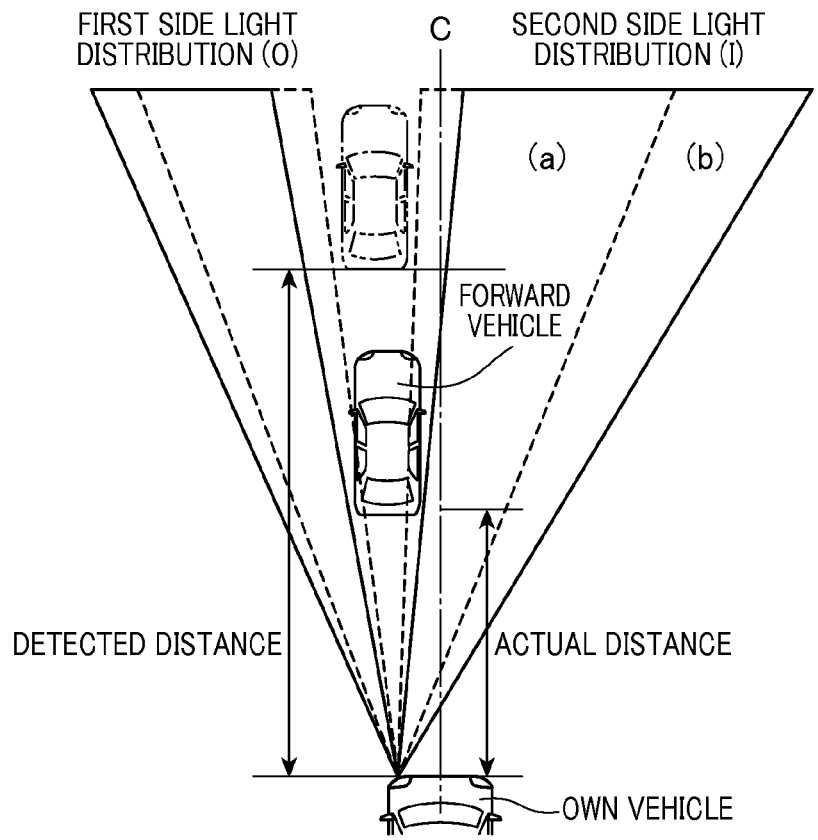
FIG. 8 is a diagram top view of a road surface where the own vehicle and the forward vehicle which is ahead of the own vehicle are present, which shows a method for correcting a light distribution irradiated from lamps of the own vehicle when the tail lamps of the forward vehicle is detected, according to a third embodiment.
FIG. 9 is a diagram for showing a relationship among a sensor detection state, correction of the shielded area, a variation (dispersion) in detected distances, and a size of the shielded area in the method for correcting a light distribution irradiated from headlamps of the own vehicle shown in FIG. 8.

FIG. 8 shows a method for correcting a light distribution of headlamps when tail lamps are detected as the lamps of the forward vehicle (i.e., tail lamps of a preceding vehicle that travels in the same direction).

In the embodiment, the control processing unit 30 detects, among light sources in the acquired image of the forward area, at least one light source that satisfies a predetermined condition such as a color condition, as the tail lamps of the forward vehicle.

If the at least one light source detected as the tail lamps that satisfies a predetermined pair condition is present, the control processing unit 30 detects the at least one light source as a pair of tail lamps. The predetermined pair condition is, for example, a condition that a plurality of light sources detected as the tail lamps have the same height and are adjacent to each other. If the at least one light source detected as the tail lamps that satisfies a predetermined pair condition is not present, the control processing unit 30 detects the at least one light source as a single tail lamp.

Based on a position of the detected tail lamps, the control processing unit 30 controls a light distribution of the respective headlamps so as not to give the glare of the headlamps to a driver of the forward vehicle. In the present embodiment, as shown in FIG. 8, the light distribution is divided into a first side (outer side) light distribution (O) and a second side (inner side) light distribution (I).

The first side light distribution (O) is a light distribution irradiated from the headlamps of the own vehicle outside one of the light and left tail lamps (e.g., the left tail lamp of the forward vehicle in FIG. 8) that is located at a far side (outer side) with respect to a center line (C) of the own vehicle. The second side light distribution (I) is a light distribution irradiated from the headlamps of the own vehicle outside the other of the light and left tail lamps (e.g., the right tail lamp of the forward vehicle in FIG. 8) that is located at a near side (inner side) with respect to the center line (C) of the own vehicle.

Thus, as shown in FIG. 8, an area between the light and left tail lamps of the forward vehicle is a shielded area in which lights are not irradiated from the headlamps of the own vehicle, which can reduce the glare of the headlamps of the own vehicle given to a driver of the forward vehicle.

In the present embodiment, the at least one light source detected as a single of tail lamps is assumed to be either of the right and left tail lamps. For example, in FIG. 8, the at least one light source detected as a single of tail lamps is assumed to be the left tail lamp. In this case, the right tail lamp is assumed to be present at a position that is shifted by a predetermined vehicle width toward a right side from a position of the left tail lamp. By the control processing unit 30, the light distribution of headlamps is controlled to be irradiated outside the positions of the right and left tail lamps.

In the present embodiment, the light distribution of headlamps may be controlled to be irradiated outside a position of a predetermined margin area given to the positions of the right and left tail lamps. In this light distribution of headlamps, the margin area is added to the shielded area between the light and left tail lamps.

FIG. 8 shows a case where the detected inter-vehicle distance between the forward vehicle and the own vehicle is larger than an actual inter-vehicle distance therebetween. In this case, the light distribution of headlamps is controlled to cover an area (a) surrounded by dashed lines of FIG. 8. This case may give the glare of headlamps to a driver of an actual forward vehicle.

In the present embodiment, in order to reduce the glare caused by a detection error of the detected inter-vehicle distance, the light distribution irradiated from the headlamps of the own vehicle is controlled depending on a variation (dispersion) in the detected inter-vehicle distance.

Specifically, the irradiation angle of the respective headlamps is corrected based on the nearest (smallest) inter-vehicle distance within a range of the variation in the detected inter-vehicle distance. In the case of FIG. 8, the light distribution irradiated from the headlamps of the own vehicle is controlled to cover an area (b) surrounded by solid lines of FIG. 8. Thus, a shielded area becomes larger as shown in FIG. 8.

Here, in a first case where the single lamp is detected, an object such as a single lamp vehicle or a motorcycle is broad in range or scope, and then, a variation in the inter-vehicle distance becomes larger than that of a second case where the pair of lamps is detected. As a result, the nearest inter-vehicle distance of the first case tends to be nearer (smaller) than that of the second case. Accordingly, a shielded area of the first case (single lamp) is larger than that of the second case (pair of lamps).

In the present embodiment, when the inter-vehicle distance between the forward vehicle and the own vehicle can be detected by a millimeter wave radar, the irradiation angle of the respective headlamps may be corrected based on the inter-vehicle distance detected by the millimeter wave radar.

As shown in FIG. 9, a variation in the detected inter-vehicle distance becomes larger in the following order from smaller to larger: i) the inter-vehicle distance detected by the millimeter wave radar; ii) the inter-vehicle distance detected by the camera when the pair of lamps is detected; and iii) the inter-vehicle distance detected by the camera when the single lamp is detected.

Thus, the size of the shielded area that is corrected based on the respective inter-vehicle distance becomes larger in the following order from smaller to larger: i) a case where the light distribution is controlled based on the inter-vehicle distance detected by the millimeter wave radar (the smallest size); ii) a case where the light distribution is controlled based on the inter-vehicle distance detected by the camera when the pair of lamps is detected (medium size); and iii) a case where the light distribution is controlled based on the inter-vehicle distance detected by the camera when the single lamp is detected (largest size).

In this way, based on the variation in the detected inter-vehicle distance, the light distribution irradiated from the headlamps of the own vehicle is corrected such that the size of the shielded area becomes larger as the variation becomes larger. Thus, the deviation between the detected inter-vehicle distance and the actual inter-vehicle distance can be reduced. This can reduce the glare of the headlamps of the own vehicle given to the driver of the forward vehicle.

(Modification)

Figure 10:
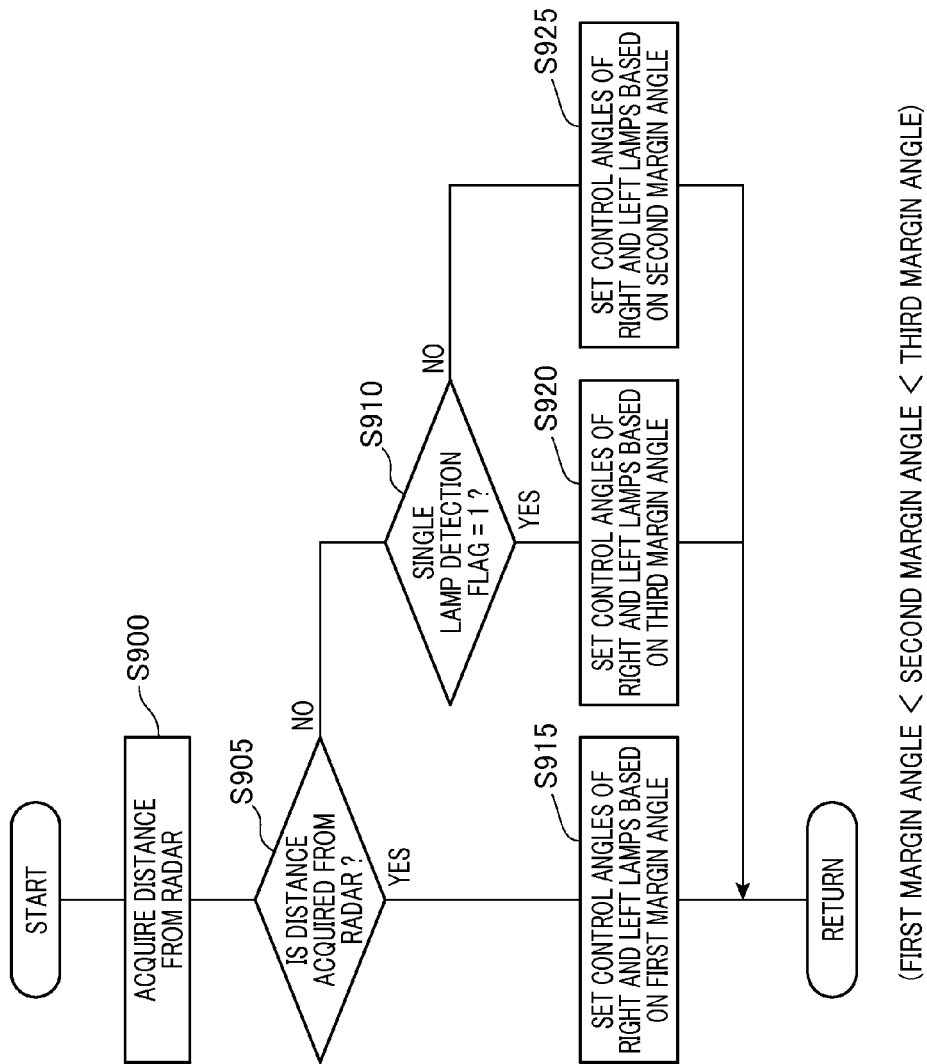
FIG. 10 is a flowchart for showing a subroutine for variable light distribution process called from the main routine shown in FIG. 3 or 7, according to the third embodiment.

Next, a modification of the first embodiment or the third embodiment will be described with reference to FIG. 10. FIG. 10 shows a flowchart of a subroutine of a variable light distribution processing performed from the main routine of FIG. 3 or FIG. 7 according to the modification.

In this case, the control processing unit 30 sets in advance a margin angle that includes a first margin angle, a second margin angle, and a third margin angle, and stores the margin angle in the ROM 302 or the RAM 303 in FIG. 6. The margin angle is set to be larger in the order of the first margin angle, the second margin angle, and the third margin angle (i.e., first margin angle<second margin angle<third margin angle).

As shown in FIG. 10, at step S900, the control processing unit 30 acquires information of an inter-vehicle distance between the own vehicle and the forward vehicle from a millimeter wave radar mounted in the own vehicle. At step S905, the control processing unit 30 judges whether or not the information of the inter-vehicle distance can be acquired from the millimeter wave radar.

If the result of this judgment in step S905 is affirmative (Yes), the control processing unit 30 proceeds to step S915, and sets a control angle (irradiated angle) of the right and left headlamps of the own vehicle, based on the first margin angle. In a situation of step S915, the inter-vehicle distance can be accurately detected by the millimeter wave radar and a variation in the detected inter-vehicle distance is small. This allows for the margin angle to be the smallest. Thus, based on the first margin angle, the control angle of the right and left headlamps is controlled at step S915.

If the result of this judgment in step S905 is negative (No), the control processing unit 30 proceeds to step S910, and judges whether or not the single lamp flag is 1.

If the result of the judgment in step S910 is affirmative (Yes), the control processing unit 30 proceeds to step S920 and sets the control angle of the right and left headlamps of the own vehicle, based on the third margin angle. In a case where the number of lamps of the forward vehicle is 1 (single lamp), an object such as a single lamp vehicle or a motorcycle is broad in range or scope, and then, a variation in the inter-vehicle distance becomes larger than that of a case where the pair of lamps is detected. Due to this, the margin angle is required to be larger. Thus, based on the third margin angle, the control angle of the right and left headlamps is controlled at step S920.

If the result of the judgment in step S910 is negative (No), the control processing unit 30 proceeds to step S925, and sets the control angle of the right and left headlamps of the own vehicle, based on the second margin angle.

In the modification, at any one of steps S915, S920, and S925, the control angle of the right and left headlamps is set based on any one of the first angle, the second margin angle, and the third margin angle. As a substitute for this, at any one of steps S915, S920, and S925, the control angle of the headlamps may be corrected based on the nearest (smallest) inter-vehicle distance among a plurality of inter-vehicle distances detected within a predetermined period (for example, within several seconds). The nearest inter-vehicle distance tends to be nearer as the variation in the detected inter-vehicle distance becomes larger. Due to this, in a situation where the variation in the detected inter-vehicle distance becomes larger, the control angle the right and left headlamps is set (calculated) based on nearest inter-vehicle distance, so that the control angle of the right and left headlamps is set in such a manner that the margin angle becomes larger.

In the modification, the inter-vehicle distance is acquired by the millimeter wave radar. As a substitute for this, the inter-vehicle distance may be acquired by a laser radar or a stereo camera. The laser radar or the stereo camera is capable of more accurately detecting the inter-vehicle distance with a smaller variation in distance, compared with a standard monocular camera.

Fourth Embodiment

Figure 11:
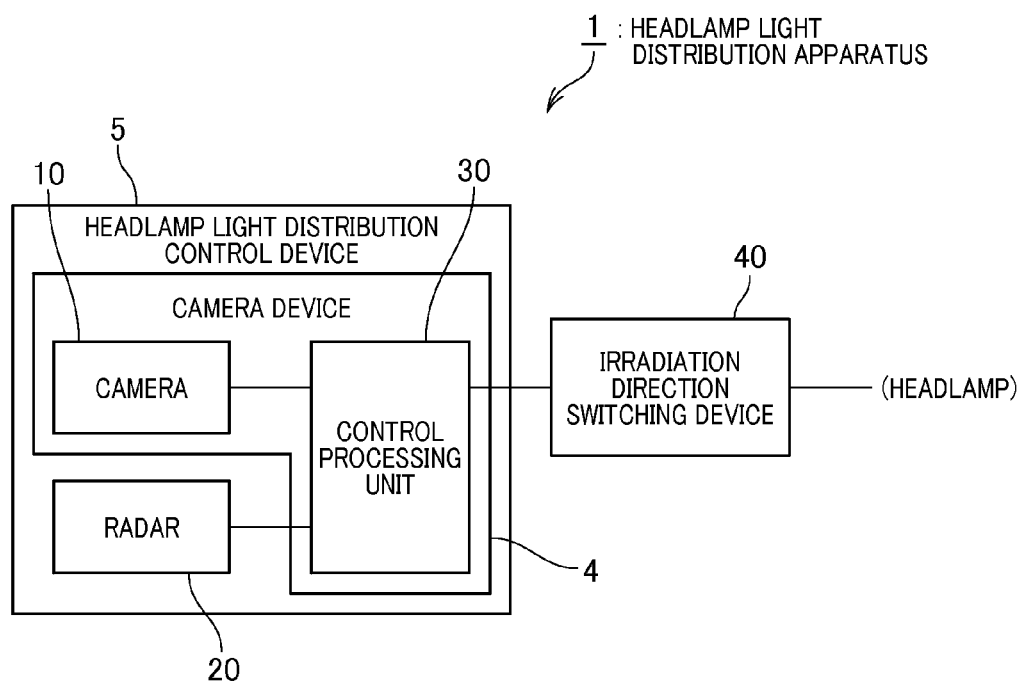
FIG. 11 is a block diagram for showing a configuration of a headlamp light distribution apparatus according to a fourth embodiment.

Next, a fourth embodiment will be described with reference to FIG. 11.

In the first embodiment, as shown in FIG. 1, the camera 10 and the control processing unit 30 are separately provided. In the present embodiment, as shown in FIG. 11, the camera 10 and the control processing unit 30 are incorporated in an electronic control unit (ECU) mounted in the vehicle to configure a camera device (camera system) 4.

The camera device 4 is an image sensor including the camera 10 and the control processing unit 30. The camera 10 includes an imager unit and an imager control unit. The imager unit is configured by, for example, a complementary metal oxide semiconductor (CMOS) imager, and acquires images around a vehicle (own vehicle). The imager control unit controls the imager unit. The control processing unit 30 processes the acquired image to produce a processing result.

Based on the processing result of the control processing unit 30, the camera device 4 externally outputs, for example, a high-beam signal, a low-beam signal, a light-shielding pattern signal (e.g., position information of a light-shielding area and an angle information of an optical axis of a headlamp) that shields only a region where a forward vehicle (a preceding vehicle or an oncoming vehicle) is present, or position information of a light source.

Fifth Embodiment

Next, a fifth embodiment will be described.

In the present embodiment, the control processing unit 30 detects an object (target object). The object target includes a road shape, a road surface state, a passing-place (turnout, free space), a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of a camera, and an external environment of a vehicle.

The control processing unit 30 is not required to detect all of these target objects. The control processing unit 30 includes a control unit that performs a vehicle control processing (described later), and may detect at least one of these target objects necessary for the vehicle control processing performed by the control unit.

For example, the control processing unit 30 further includes an analysis unit, and performs a light source detecting processing by using analysis unit and the control unit. In the light source detecting processing, the analysis unit judges whether at least one light source detected is a light source (i.e., tail lamp) of a preceding vehicle or a light source (i.e, head lamp) of an oncoming vehicle. A well-known method may be used as a method for judging whether a light source is a tail lamp of a preceding vehicle or a head lamp of an oncoming vehicle.

For example, a judging method using a color of a light source may be used. In the judging method, if a color of a light source is within a predetermined range close to a white color, the light source is judged to be a head lamp of an oncoming vehicle. If a color of a light source is within a predetermined range close to a red color, the light source is judged to be a tail lamp of a preceding vehicle.

The analysis unit thereby outputs, to the control unit, as a camera information, i) a position coordination of the respective judged light source in the image and ii) preceding vehicle/oncoming vehicle information that indicates whether the light source is a preceding vehicle or an oncoming vehicle. The control unit receives the camera information from the analysis unit. Based on the received camera information, the control unit performs i) switching between high-beam and low-beam irradiated from the headlamps of the own vehicle and ii) swivel control for an optical axial direction of the respective headlamps.

The control processing unit 30 further includes a detection unit, and performs a white line output processing by using the detecting unit and the control unit. In the white line output processing, the detection unit performs a well-known white line detection processing (for example, white line detection processing using an image binarization or Hough transform) for the image acquired by the camera 10. The detection unit thereby detects a position of a white line on a road included in the acquired image, and outputs information of the detected position of the white line to the control unit. The control unit receives the information of the detected position of the white line from the detection unit. Based on the received information, the control unit gives warning to an occupant of the own vehicle in a case where there is high probability that the own vehicle will deviate from a lane and in a case where the own vehicle has deviated from a lane.

The control processing unit 30 executes control programs stored in the ROM 302 or the RAM 303 in FIG. 6 to perform various vehicle controls using a vehicle control device such as a headlamp, an engine, a brake, or a steering.

The vehicle controls include a forward collision avoidance, an intersection collision avoidance, a crossing collision avoidance, a speed alert, a lane deviation (lane departure) prevention, a collision alert, an inter-vehicle distance alert, a lane deviation alert, an automatic high beam, a traffic sign display, a full speed range adaptive cruise control, a lane keeping, a lane changing accident prevention, a blind spot alert, a blind spot monitor, an automatic lane changing, a front cross traffic alert, a rear cross traffic alert, a stepping error prevention (preventing pedal application errors of a brake pedal and an accelerator pedal), and an automatic parking. In the present embodiment, such vehicle controls can be used as well-known techniques, detailed description thereof is omitted. The control processing unit 30 is not required to perform all of the vehicle controls. The control processing unit 30 may perform at least one of the vehicle controls.

Sixth Embodiment

Next, a sixth embodiment will be described.

In the present embodiment, a stereo camera may be used as a substitute for the camera device 4 as described in the fourth embodiment. In this embodiment, am inter-vehicle distance between the forward vehicle and the own vehicle may be acquired by the stereo camera used as a substitute for the radar described in the fourth embodiment.

Seventh Embodiment

Next, a seventh embodiment will be described.

In the above embodiments and modifications, a radar such as a millimeter wave radar or a laser radar may be provided. For example, the millimeter wave radar may be used for measuring a distance to a target object or a relative velocity of the target object. Thus, the target object can be more accurately detected. In addition, when the light source is detected among images acquired by the camera, the target object having high relative velocity measured by the millimeter wave radar can be preferentially analyzed among the images. Thus, the target object can be more rapidly detected. As a result, the target object can be more accurately and more rapidly detected, which can reduce the glare of the headlights given to a driver of the forward vehicle.

What is claimed is:

1. A headlamp light distribution control device for a vehicle, the headlamp light distribution control device comprising:
   an image acquisition unit configured to acquire an image of a forward area which is ahead of an own vehicle;
   an extraction unit configured to extract a forward vehicle from the image of the forward area acquired by the image acquisition unit;
   a distance acquisition unit configured to acquire a distance between the own vehicle and the forward vehicle;
   a judgment unit configured to
      extract a light source configured by a pair of lamps mounted in the forward vehicle from the image of the forward vehicle extracted by the extraction unit if the distance from the own vehicle to the forward vehicle acquired by the distance acquisition unit is less than a predetermined value, and
      judge the number of the extracted light sources; and
   a control unit configured to
      set, when the judgment unit judges that the number of the extracted light sources is two, a shielded area in an irradiation area of a headlamp of the own vehicle so as to prevent an area including the lamp of the forward vehicle from being irradiated, and
      set, when the judgment unit judges that the number of the extracted light sources is one, a shielded area in the irradiation area of the headlamp of own vehicle so as to have a margin in right and left directions larger than the shielded area set when the number of the extracted light sources is two.

2. A headlamp light distribution control device for a vehicle, the headlamp light distribution control device comprising:
   an image acquisition unit configured to acquire an image of a forward area which is ahead of an own vehicle;
   an extraction unit configured to extract a forward vehicle from the image of the forward area acquired by the image acquisition unit; and
   a control unit configured to
      set, when the number of light sources in the image of the extracted forward vehicle is two, a shielded area in an irradiation area of a headlamp of the own vehicle so as to prevent an area including the lamp of the forward vehicle from being irradiated, and
      set, when the number of light sources in the image of the extracted forward vehicle is one, a shielded area in the irradiation area of the headlamp of own vehicle so as to have a margin in right and left directions larger than the shielded area set when the number of the extracted light sources is two.

3. The headlamp light distribution control device according to claim 2, further comprising:
   a distance acquisition unit configured to acquire a distance between the own vehicle and the forward vehicle;
   a judgment unit configured to
      extract a light source configured by a pair of lamps mounted in the forward vehicle from the image of the forward vehicle extracted by the extraction unit if the distance from the own vehicle to the forward vehicle acquired by the distance acquisition unit is less than a predetermined value, and
      judge the number of the extracted light sources.

4. The headlamp light distribution control device according to claim 1, wherein:
   the distance acquisition unit acquires distance information indicating a distance between the own vehicle and the forward vehicle from at least one of a radar, a stereo camera, and a monocular camera; and
   based on a variation in the distance indicated by the acquired distance information, the control unit sets the shielded area to be larger as the variation in the distance becomes larger.

5. The headlamp light distribution control device according to claim 4, wherein:
   the control unit sets the shielded area so as to satisfy a relationship expressed by $A>B>C$ where
      A is a size of the shielded area that is set when the distance information is acquired by the radar or the stereo camera,
      B is a size of the shielded area that is set when the distance information is not acquired by the radar or the stereo camera and when the number of lamps of the forward vehicle is two, and
      C is a size of the shielded area that is set when the distance information is not acquired by the radar or the stereo camera and when the number of lamps of the forward vehicle is one.

6. The headlamp light distribution control device according to claim 2, further comprising:
   a distance acquisition unit configured to acquire distance information indicating a distance between the own vehicle and the forward vehicle from at least one of a radar, a stereo camera, and a monocular camera,
   wherein, based on a variation in the distance indicated by the acquired distance information, the control unit sets the shielded area to be larger as the variation in the distance becomes larger.

7. The headlamp light distribution control device according to claim 6, wherein:

the control unit sets the shielded area so as to satisfy a relationship expressed by

A>B>C where
- A is a size of the shielded area that is set when the distance information is acquired by the radar or the stereo camera,
- B is a size of the shielded area that is set when the distance information is not acquired by the radar or the stereo camera and when the number of lamps of the forward vehicle is two, and
- C is a size of the shielded area that is set when the distance information is not acquired by the radar or the stereo camera and when the number of lamps of the forward vehicle is one.

8. The headlamp light distribution control device according to claim 3, wherein:
the distance acquisition unit acquires distance information indicating a distance between the own vehicle and the forward vehicle from at least one of a radar, a stereo camera, and a monocular camera; and
based on a variation in the distance indicated by the acquired distance information, the control unit sets the shielded area to be larger as the variation in the distance becomes larger.

9. The headlamp light distribution control device according to claim 8, wherein:
the control unit sets the shielded area so as to satisfy a relationship expressed by

A>B>C where:
- A is a size of the shielded area that is set when the distance information is acquired by the radar or the stereo camera;
- B is a size of the shielded area that is set when the distance information is not acquired by the radar or the stereo camera and when the number of lamps of the forward vehicle is two; and
- C is a size of the shielded area that is set when the distance information is not acquired by the radar or the stereo camera and when the number of lamps of the forward vehicle is one.

10. The headlamp light distribution control device according to claim 1, further comprising:
a stereo camera capable of acquiring a distance between the forward vehicle and the own vehicle.

11. The headlamp light distribution control device according to claim 1, further comprising:
a radar capable of detecting at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, and an external environment of the own vehicle.

12. The headlamp light distribution control device according to claim 2, further comprising:
a stereo camera capable of acquiring a distance between the forward vehicle and the own vehicle.

13. The headlamp light distribution control device according to claim 2, further comprising:
a radar capable of detecting at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, and an external environment of the own vehicle.

14. A camera device, coupled to a headlamp system for a vehicle, the headlamp system including a headlamp irradiating light in front of an own vehicle and a changing unit for changing an irradiation area of the headlamp, the camera device comprising:
a control unit configured to control the changing unit;
an image acquisition unit configured to acquire an image of a forward area which is ahead of the own vehicle; and
an extraction unit configured to: extract a forward vehicle from the image of the forward area acquired by the image acquisition unit; and extract a light source configured by a pair of lamps mounted in the forward vehicle from the image of the extracted forward vehicle,
wherein the control unit is configured to:
set, when the number of the extracted light sources is two, a shielded area in an irradiation area of the headlamp of the own vehicle so as to prevent an area including the lamp of the forward vehicle from being irradiated;
set, when the number of the extracted light sources is one, a shielded area in the irradiation area of the headlamp of own vehicle so as to have a margin in right and left directions larger than the shielded area set when the number of the extracted light sources is two; and
output information of the set shielded area to the changing unit.

15. The camera device according to claim 14, wherein:
the camera device includes a stereo camera capable of acquiring a distance between the forward vehicle and the own vehicle.

16. The camera device according to claim 14, further comprising:
a radar capable of detecting at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, and an external environment of the own vehicle.

17. A camera device, coupled to a headlamp system for a vehicle, the headlamp system including a headlamp irradiating light in front of an own vehicle and a changing unit for changing an irradiation area of the headlamp, the camera device comprising:
a control unit configured to control the changing unit;
an image acquisition unit configured to acquire an image of a forward area which is ahead of the own vehicle; and an extraction unit configured to extract a forward vehicle from the image of the forward area acquired by the image acquisition unit; and extract a light source configured by a pair of lamps mounted in the forward vehicle from the image of the extracted forward vehicle, wherein the control unit is configured to:
  detect, based on the image of the forward area, at least one of target objects including a lane, a road shape, a road surface state, a passing-place, a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a road side object, a signboard, a road sign, a traffic signal, an interrupting object that interrupts a visual field of the camera device, an external environment of the own vehicle;
  control the changing unit to change, when the at least one of target objects is detected, the irradiation area of the headlamp so as to reduce a glare of the headlamp given to the detected at least one of target objects;
  perform a vehicle control for the own vehicle regarding at least one of a forward collision avoidance, an intersection collision avoidance, a crossing collision avoidance, a speed alert, a lane deviation prevention, a collision alert, an inter-vehicle distance alert, a lane deviation alert, an automatic high beam, a traffic sign display, a full speed adaptive cruise control, a lane keeping, a lane changing accident prevention, a blind spot alert, a blind spot monitor, an automatic lane changing, a front cross traffic alert, a rear cross traffic alert, and a stepping error prevention, an automatic parking;
  set, when the number of the extracted light sources is two, a shielded area in an irradiation area of the headlamp of the own vehicle so as to prevent an area including the lamp of the forward vehicle from being irradiated;
  set, when the number of the extracted light sources is one, a shielded area in the irradiation area of the headlamp of own vehicle so as to have a margin in right and left directions larger than the shielded area set when the number of the extracted light sources is two; and
  output information of the set shielded area to the changing unit.

18. The camera device according to claim 17, wherein:
the camera device includes a stereo camera capable of acquiring a distance between the forward vehicle and the own vehicle.

19. The camera device according to claim 17, further comprising:
  a radar capable of detecting the at least one of target objects.

* * * * *